Dec. 1, 1925.  1,564,159

H. WATSON ET AL

MOTOR CAR STARTING SWITCH PROTECTOR

Filed June 22, 1922

INVENTORS
HENRY WATSON
JOHN. HENRY. WATSON.

BY
ATT'YS

Patented Dec. 1, 1925.

1,564,159

UNITED STATES PATENT OFFICE.

HENRY WATSON AND JOHN HENRY WATSON, OF VERNON, BRITISH COLUMBIA, CANADA.

MOTOR-CAR STARTING-SWITCH PROTECTOR.

Application filed June 22, 1922. Serial No. 570,224.

*To all whom it may concern:*

Be it known that we, HENRY WATSON and JOHN HENRY WATSON, both subjects of the King of Great Britain, and both residing at the city of Vernon, in the Province of British Columbia, have invented certain new and useful Improvements in Motor-Car Starting-Switch Protectors, of which the following is a specification.

This invention relates to improvements in motor car starting switch protector, and the objects of the invention are to provide a simple and effective device for protecting the floor switch of an electric starting motor used on motor vehicles and such a device as will leave the floor switch readily accessible to the driver of the vehicle so that when not in use the floor switch is covered and protected, and which may be readily put into operation by the driver's foot.

Further objects of the invention are to provide simple and effective means for returning the switch cover to normal position and retaining it in such position.

Further objects still are generally to improve and simplify the construction of the invention to better adapt it to perform the functions required of it.

It consists essentially of the improved construction hereinafter described in detail in the accompanying specification and drawing.

In the drawings.

In the drawings, like characters of reference indicate corresponding parts in all the figures.

Figure 1:
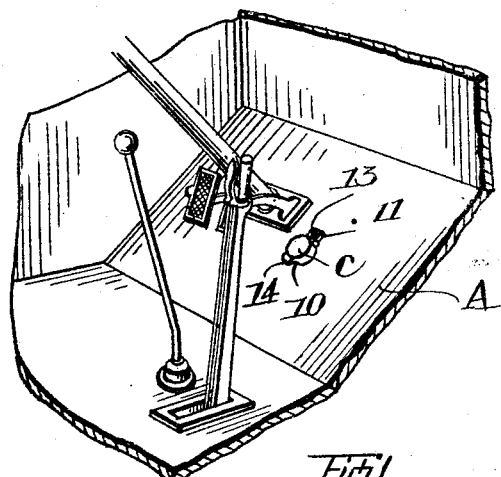
Figure 1 is a perspective view of a portion of the floor of a motor vehicle showing our improved protector thereon.
Figure 5:
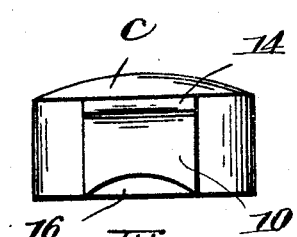
Figure 5 is a front elevation.
Figure 3:
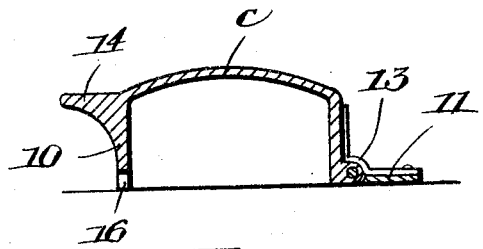
Figure 3 is a sectional elevation to a large scale.
Figure 2:
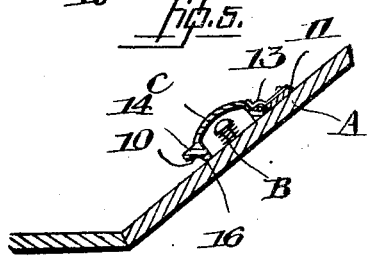
Figure 2 is a sectional elevation taken of the protector.
Figure 4:
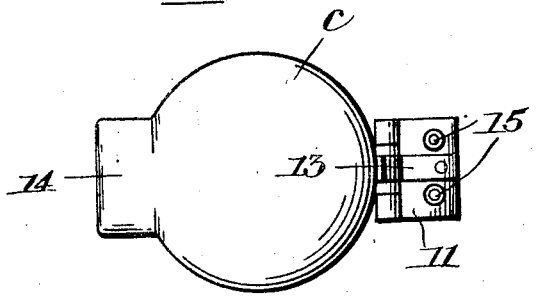
Figure 4 is a plan view.

Referring to the drawings:

A represents the floor of a motor vehicle having the usual operating levers and B indicates the floor switch for the electric starting motor. C indicates our improved protecting member of dome shape having a dependent annular flange 10 designed to enclose the switch or button B, the end of this member being open and resting on the floor. The member C is hinged to a suitable connecting plate 11 and is designed to be held in that position covering the switch B by gravity and by a flat spring 13 secured to the plate 11 and bearing against the side of the dome shaped member C. The plate 11 is formed with a plurality of screw holes 15 through which attaching screws may be inserted. The lower edge of the peripheral flange 10 is formed with a recess 16 opposite the hinge plate which will prevent any vacuum or suction being created between the protector and the floor.

For convenience in lifting the dome shaped member, a lug 14 is provided opposite the plate 11 designed to be engaged by the foot of the operator.

It will be seen that the protecting member may be used on either a sloping or a flat floor and can be built in the motor vehicle itself or attached later as an accessory. The shape of the dome shaped member should preferably conform to the shape of the button of the floor switch.

As many changes could be made in the above construction and many widely different embodiments of our invention within the scope of the claims, constructed without departing from the spirit or scope thereof, it is intended that all matter contained in the accompanying specification and drawings shall be interpreted as illustrative and not in a limiting sense.

What we claim as our invention is:

1. The combination with the button controlling the starting mechanism of an automobile motor, or the like, a portion of which normally projects through an aperture in the floor of the automobile, of a guard member mounted so that it may be moved into a position to cover or protect said button against being accidentally depressed, and a spring normally holding said member in its operative position.

2. The combination in an automobile, of an appropriate support as the floor of an automobile body, the button of a self-starter switch exposed above said support or floor, and a guard connected with the support or floor and adapted to normally rest over and prevent accidental depression of said button, said guard being displaceable by the shoe of the driver and adapted when released to reassume a position over the button.

In witness whereof we have hereunto set our hands.

HENRY WATSON.
JOHN HENRY WATSON.